June 4, 1968    A. W. HÖWE    3,386,616
DISPENSING DEVICE FOR ICE CUBES, LUMP SUGAR AND THE LIKE
Filed April 7, 1966    2 Sheets-Sheet 2

Inventor
AUGUST WILHELM HÖWE
BY H. Gibner Lehmann
AGENT 3,386,616
DISPENSING DEVICE FOR ICE CUBES, LUMP
SUGAR AND THE LIKE
August Wilhelm Höwe, Gottelmanstrasse 8,
Mainz, Germany
Filed Apr. 7, 1966, Ser. No. 541,006
Claims priority, application Germany, Apr. 9, 1965,
H 51,693
8 Claims. (Cl. 220—85)

ABSTRACT OF THE DISCLOSURE

Dispensing device for ice cubes or lump sugar, comprising an open-top container including a hinged top cover which can be swung upward. In the container is a supporting rack to hold a tongs. The container is arranged with a clearance space so that the handle of the tongs, when the latter is racked, can project at the exterior while the cover remains closed.

The invention refers to a dispensing device comprising a container for ice cubes, lump sugar and the like, which is closed by a cover hinged to a horizontal axis, and comprising a tongs carried in the container.

The invention is based on the problem of creating an improved dispenser comprising a container for ice cubes, lump sugar and the like, having the tongs hygienically and trouble-freely placed within the interior of the box, where they are protected against dirtying.

The invention achieves this by providing at the interior of the container a partition, taking up the tongs for ice cubes and the like, which is arranged in such a manner that only within the region of their handle the tongs can be reached by hand, in order to be taken out.

This way there is not only provided a permanent hygienic place for tongs, which keeps the tongs from getting contaminated, but the user is also forced to seize the tongs at their handle only. The handle of the tongs also serves as cover-handle to easily open and in case also close the cover.

The examples of two designs of the invention will be explained more in detail by means of the drawing as follows:

There are shown:

Figure 1:
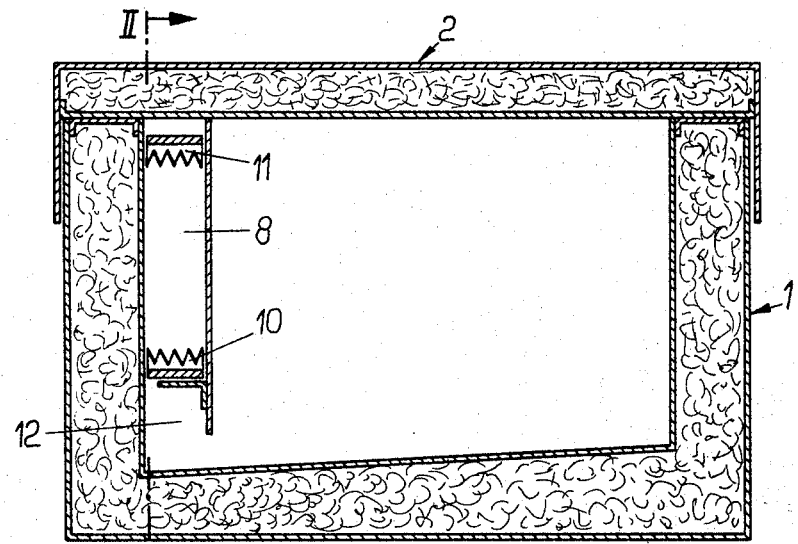
FIG. 1 is a vertical sectional view of a dispensing device according to the invention, the section being through the sides and susbtantially parallel to the front and rear walls.

According to the invention there is inserted a removable dividing or partitioning wall 7 in the interior of the actual open-top container structure 1, by which a narrow chamber 8 is partitioned off the interior space of the actual container 1. The ice cube tongs 9 are placed in this narrow chamber 8. On the diagram-example the ice cube tongs 9 consist of jaw portions and a handle. The jaw portions comprise a bent or angularly extending leg 10 and a leg 11 which is essentially straight. Novel means support the tongs 9 in a storage position in the container 1, said means enabling the tongs to be removed through the top of the container when the cover 2 is swung upward. There is also a means provided, which furnishes clearance space for the handle of the tongs, enabling the handle to protrude from the container 1 when the cover is closed and the tongs are in the storage position. This provides extra convenience, and sanitation when using the dispenser. The bent leg 10 of the tongs reaches down into the chamber 8 and lies on a transverse member or support 12 which is attached to the partition wall 7, whereas the straight leg 11 essentially closes the side-chamber 8 at the top. The end of the handle 13 of the ice cube tongs 9 extends through a relief or notch 14 let free on the upper edge of the side of the container 1 lying opposite to the hinged axis 3 and protrudes outwards underneath the cover 2. The cover 2 can be swung upward to expose the container interior. Thus the end of the handle 13 of the tongs constitutes an operating handle for the opening of the cover 2, whereat the bent leg 10 slides over the support 12. The handle 13 is advantageously disposed at the front wall of the container 1, whereas the hinge 3 is on the opposite wall, namely the back wall.

Figure 2:
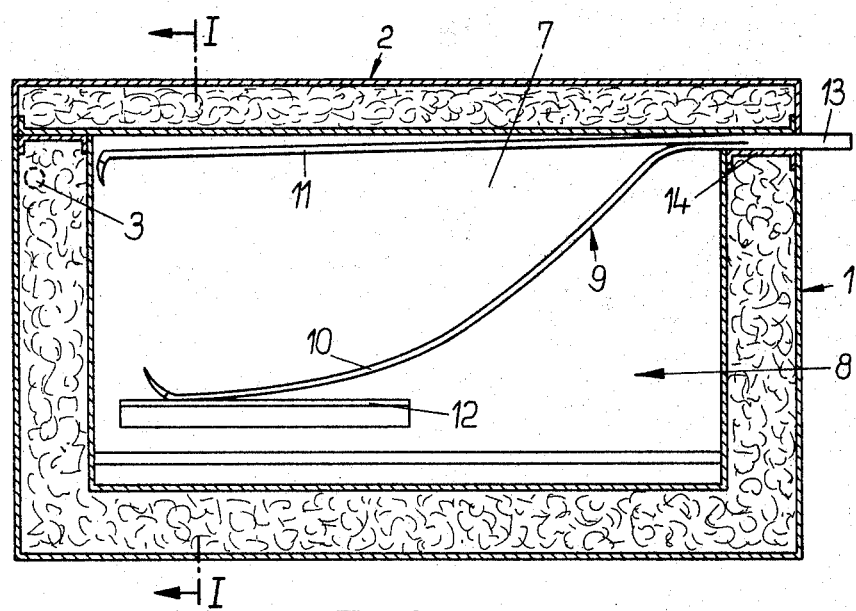
FIG. 2 is a vertical section of the dispensing device, taken on line II—II of FIG. 1. The section of FIG. 1 is on line I—I of FIG. 2.
Figure 3:
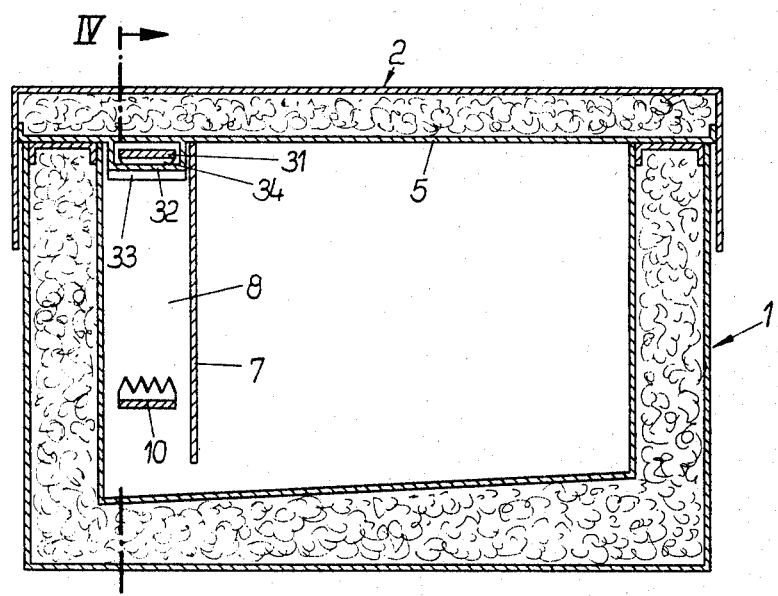
FIG. 3 is a vertical sectional view of a dispensing device constituting a modification of the invention, taken through the two sides and substantially parallel to the front and rear walls.
Figure 4:
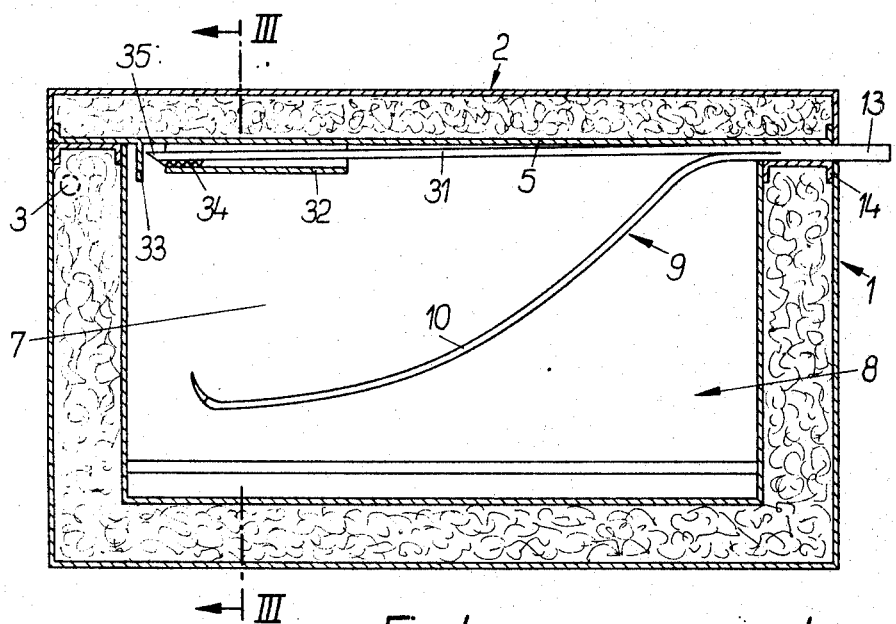
FIG. 4 is a vertical sectional view of the dispensing device of FIG. 3, taken on the line IV—IV of FIG. 3. The section of FIG. 3 is on line III—III of FIG. 4.

In the example featuring the FIGURES 3 and 4 we have a table ice cube container, which is somewhat changed with regard to the FIGURES 1 and 2, as far as the placing of the tongs is concerned. All the other parts of the table ice cube container, corresponding with those of FIGURES 1 and 2, have the same reference-numbers as those used in the FIGURES 1 and 2. The wall 7 separates the tongs 9 from the contents of the container 1, whereby the contents are not likely to adhere to the tong jaw portions.

According to FIGURES 3 and 4, there is a holding device for the tongs 9, attached to the lower side 5 of the cover 2 above the compartment 8, in order to suspend the tongs inside of the compartment 8 at the lower side 5 of the cover. This suspension-device has been realized in the diagram-example the way of a bag or socket, attached to the lower side 5 of the cover. It consists of a longish noose or transverse member 32, into which there has to be inserted the upper leg 31 of the tongs 9, and of an abutment plate 33, against which the end of the leg 31 of the tongs comes to lie. In order to insert the leg 31 of the tongs more easily, this leg, as distinguished from the FIGURES 1 and 2 for instance, is provided with transverse ribs 34, co-operating with the claw provided at the end of the other leg, like in the example featuring FIGURES 1 and 2. Furthermore the leg of the tongs can be furnished at its end with a sharpened lining 35 for separating ice cubes.

The two diagram-examples feature table-containers for ice cubes, but the characteristics of the invention can be used in the same way also for boxes for lump sugar and the like. Containers with a circular section can have the partition with two dividing walls in diametral position. In each example, the straight leg portion of the tongs spans the top of the space between the partitioning wall and the adjoining side of the container 1.

I claim:

1. A dispensing device for material which is in the form of substantially discrete particles, comprising in combination:
    (a) an open-top container structure,
    (b) a cover for the container, hinged to one side of the container to swing upward for exposing the container interior,
    (c) a tongs having jaw portions and a handle,
    (d) rack means for supporting the tongs in a storage position in the container with the cover closed, said means enabling removal of the tongs through the top of the container when said cover is swung upward,
    (e) means providing a clearance space for the handle of the tongs, enabling said handle to protrude from the container at a location opposite said one container side when the tongs is in said racked storage position and the cover is closed.

2. The invention as in claim 1, wherein:
   (a) the means providing said handle clearance space comprises a notch in the upper edge of the front container wall,
   (b) the bottom wall of said notch and the underside of said cover closely fitting against the handle of the tongs.

3. A dispensing device for material which is in the form of substantially discrete particles, comprising in combination:
   (a) an open-top container structure,
   (b) a cover for the container, hinged to one side of the container to swing upward for exposing the container interior,
   (c) a tongs having jaw portions and a handle,
   (d) means for supporting the tongs in a storage position in the container with the cover closed, said means enabling removal of the tongs through the top of the container when said cover is swung upward, and
   (e) means providing a clearance space for the handle of the tongs, enabling said handle to protrude from the container at a location opposite said one container side when the tongs is in said storage position and the cover is closed,
   (f) said means for supporting the tongs comprising a vertical partitioning wall in the container, for effecting separation of the tongs and container contents,
   (g) said supporting means further comprising a transverse member disposed in the container and engageable with one leg of the tongs.

4. The invention as in claim 3, wherein:
   (a) means are provided, for removably supporting the partitioning wall in the container.

5. A dispensing device for material which is in the form of substantially discrete particles, comprising in combination:
   (a) an open-top container structure,
   (b) a cover for the container, hinged to one side of the container to swing upward for exposing the container interior,
   (c) a tongs having jaw portions and a handle,
   (d) means for supporting the tongs in a storage position in the container with the cover closed, said means enabling removal of the tongs through the top of the container when said cover is swung upward, and
   (e) means providing a clearance space for the handle of the tongs, enabling said handle to protrude from the container at a location opposite said one container side when the tongs is in said storage position and the cover is closed,
   (f) said tongs having one straight leg and one angularly extended leg,
   (g) said means for supporting the tongs comprising a vertical partitioning wall in the container, for effecting separation of the tongs and container contents, and comprising means for carrying the tongs with the straight leg thereof spanning the top of the space between said partitioning wall and a side wall of the container.

6. The invention as in claim 5, wherein:
   (a) the tong-supporting means comprises a transverse member disposed between the partitioning wall and said container side wall, and positioned for engagement with the angularly extended leg of the tongs.

7. The invention as in claim 5, wherein:
   (a) the tong-supporting means comprises a transverse member disposed between the partitioning wall and said container side wall and positioned for engagement with the straight leg of the tongs,
   (b) said transverse member being carried by said cover.

8. The invention as in claim 7, wherein:
   (a) the tong-supporting means comprises a socket, one wall of which is constituted by said transverse member.

References Cited
UNITED STATES PATENTS

| 221,389 | 11/1879 | Birch | 220—85 |
| 1,997,624 | 4/1935 | Beneit | 220—95 |
| 2,705,334 | 4/1955 | Farrow | 220—90 |

FOREIGN PATENTS 249,792  4/1926  Great Britain.

RAPHAEL H. SCHWARTZ, *Primary Examiner.*